US008838951B1

(12) United States Patent
Hicks et al.

(10) Patent No.: US 8,838,951 B1
(45) Date of Patent: Sep. 16, 2014

(54) AUTOMATED WORKFLOW GENERATION

(75) Inventors: Matthew J. Hicks, Dallas, TX (US);
Teresa M. Bieda, Murphy, TX (US)

(73) Assignee: Raytheon Company, Waltham, MA (US)

( * ) Notice: Subject to any disclaimer, the term of this patent is extended or adjusted under 35 U.S.C. 154(b) by 687 days.

(21) Appl. No.: 13/042,323

(22) Filed: Mar. 7, 2011

(51) Int. Cl.
*G06F 15/177* (2006.01)
*H04L 9/00* (2006.01)
*H04L 29/02* (2006.01)
*G06Q 10/06* (2012.01)
*H04L 12/24* (2006.01)
*H04L 29/06* (2006.01)

(52) U.S. Cl.
CPC .............. *G06F 15/177* (2013.01); *H04L 29/02* (2013.01); *G06Q 10/0633* (2013.01); *H04L 41/08* (2013.01); *H04L 63/00* (2013.01)
USPC ........... 713/100; 705/7.27; 709/220; 719/311

(58) Field of Classification Search
CPC ......... H04L 29/00; H04L 29/02; H04L 29/04; H04L 29/06; H04L 29/06047; H04L 29/06224; H04L 41/08; H04L 41/0803; H04L 41/0806; H04L 41/0823; H04L 63/00; G06F 15/177; G06F 8/60; G06F 8/71; G06Q 10/06; G06Q 10/0633; G06Q 10/0635; Y04S 40/162
USPC .......... 705/7, 27, 500; 709/223, 226; 713/100
See application file for complete search history.

(56) References Cited

U.S. PATENT DOCUMENTS

| | | | |
|---|---|---|---|
| 8,271,940 B2 | 9/2012 | Vitanov et al. | |
| 2006/0067252 A1* | 3/2006 | John et al. | 370/261 |
| 2009/0144120 A1* | 6/2009 | Ramachandran | 705/9 |
| 2009/0171708 A1* | 7/2009 | Bobak et al. | 705/7 |
| 2009/0271501 A1 | 10/2009 | Shenfield et al. | |
| 2010/0121668 A1* | 5/2010 | Hohmann | 705/8 |
| 2010/0223560 A1* | 9/2010 | Shenfield et al. | 715/744 |

OTHER PUBLICATIONS

Dierk König, et al., "*Groovy in Action*", Chapter 9, Section 9.4, Working with templates, Manning Publications Co., New York, 6 pages, 2007.
Groovy, An agile dynamic language for the Java Platform, Groovy-Groovy Templates, © 2011 Codehaus Foundation, http://groovy.codehaus.org/Groovy+Templates, 4 pages, 2011.

* cited by examiner

*Primary Examiner* — Fahmida Rahman
(74) *Attorney, Agent, or Firm* — Cantor Colburn LLP

(57) ABSTRACT

In certain embodiments, a method includes accessing a template, the template comprising a plurality of static portions and a plurality of dynamic portions. A first set of parameters associated with a first node are accessed. The method includes generating a first set of instructions that configure a device to communicate with the first node. The first set of instructions includes the static portions and the first set of parameters. The first set of parameters are arranged according to the plurality of dynamic portions. A second set of parameters associated with a second node are accessed. The method includes generating a second set of instructions that include the static portions and the second set of parameters. The second set of parameters are arranged according to the plurality of dynamic portions. The first set of instructions and the second set of instructions include Business Process Execution Language.

20 Claims, 9 Drawing Sheets

```
<?xml version = "1.0" encoding = "UTF-8" ?>
<process name="${orch.name}"
402        targetNamespace="${orch.namespace}"
           xmlns="http://schemas.xmlsoap.org/ws/2003/03/business-process/"
           xmlns:tns="${orch.namespace}"
           xmlns:xp20
="http://www.oracle.com/XSL/Transform/java/oracle.tip.pc.services.functi
ons.Xpath20"

...

xmlns:env="http://schemas.xmlsoap.org/soap/envelope/">
<!-- <bpelx:exec import="org.w3c.dom.Node"/>
404    <bpelx:exec import="java.util.Calendar"/>
       <bpelx:exec import="com.raytheon.dscds.orchestrator.utils.Logger"/>
       <bpelx:exec
import="com.raytheon.dscds.orchestrator.utils.LogEvent"/>-->
    <!--

///////////////////////////////////////////////////////////////////
///////////////////////////////////////////////////////////////////
////////
        PARTNERLINKS
        List of services participating in this BPEL process ///////////////////////////////////////////////////////////////////
///////////////////////////////////////////////////////////////////
////////
    -->
    <partnerLinks>
        <!-- Inbound Service Partnerlink --
        <partnerLink name="${service.name}In"
                     partnerLinkType="svc:${service.name}PL"
```

FROM FIG. 4A

406
```
<% /* Add additional partnerLink role for Async */
    if(operationList.any{ it.mep == 'async'}) { %>
                partnerRole="${service.name}Consumer"
<% } %>
                myRole="${service.name}Provider"/>
    <!-- Outbound Service Partnerlink -->
    <partnerLink name="${service.name}Out"
                partnerLinkType="svc:${service.name}PL"
<% /* Add additional partnerLink role for Async */
    if(operationList.any{ it.mep == 'async'}) { %>
                myRole="${service.name}Consumer"
<% } %>
                partnerRole="${service.name}Provider"/>
    <!-- Pes Partnerlinks (One for each PES required by policy) -->
```

408
```
<% /* Add a partnerLink for each PES */
    pesSet.each{ pes -> %>
    <partnerLink name="${pes.name}"
                partnerLinkType="pes:PesPL"
    <% /* Add additional partnerLink role for Async PES */
        if(pes.mep == 'async') { %>
                myRole="PesConsumer"
    <% } %>
                partnerRole="PesProvider"/>
<% } %>
</partnerLinks>
<!--
```

///////////////////////////////////////////////////////////////
///////////////////////////////////////////////////////////////
////////
GLOBAL VARIABLES
List of messages and XML documents used within this BPEL process ///////////////////////////////////////////////////////////////
///////////////////////////////////////////////////////////////
////////
-->
<variables>

FROM FIG. 4B

```
    <!-- Operation Request Variables for Pick -->
<% /* Add a request variable for each operation */
    operationList.each { operation -> %>
    <variable name="${operation.name}Request" messageType="svc:
${operation.requestMsg}"/>
<% } %>
    <variable name="wsaMessageId" element="wsa:MessageID"/>
    <variable name="payloadHolder" element="orch:payloadHolder"/>

<% /* Async Header Variables */
    if(operationList.any{ it.mep == 'async'}) { %>
    <variable name="wsaReplyTo" element="wsa:ReplyTo"/>
    <variable name="wsaRelatesTo" element="wsa:RelatesTo"/>
<% } %>

. . .

</variables>
    <!--
///////////////////////////////////////////////////////////////
///////////////////////////////////////////////////////////////
////////
    ORCHESTRATION LOGIC
    Set of activities coordinating the flow of messages across
    the services integrated within this business process
///////////////////////////////////////////////////////////////
///////////////////////////////////////////////////////////////
////////
    -->
  <sequence name="main">
  <pick name="PickOperation" createInstance="yes">

<!-- Operation Scope (One for each operation within the service
WSDL) -->
<% /* Create onMessage branch for each operation */
    operationList.each { operation -> %>
        <onMessage portType="svc:${service.portType}"
operation="${operation.name}"
```

FROM FIG. 4C

```
                        variable="${operation.name}Request"
partnerLink="${service.name}In"
    <% /* Add async headers */
        if(operationList.any{ it.mep == 'async'}) { %>
                        bpelx:headerVariable="wssHeaderReq wsaMessageId
wsaReplyTo">
    <% } else { %>
                        bpelx:headerVariable="wssHeaderReq wsaMessageId">
    <% } %>
                <scope name="${operation.upperCase}InScope">
                    <!-- Scope Local Variables -->
                    <variables>
                        <!-- Request and Response Variables -->
                        <variable name="serviceInRequest" messageType="svc:
${operation. requestMsg} "/>
                        <% /* Check to see if response variable is necessary */
                            if(operation.mep != 'oneway') { %>
                            <variable name="serviceInResponse" messageType="svc:
${operation.responseMsg}"/>
                        <% } %>
                    </variables>

...

<sequence name="${operation.upperCase}Sequence">
                        <!--<bpelx:exec name="GetRequestStartTime"
language="java"
                            version="1.5">
                        < ! [CDATA [//
long startTime = Calendar.getInstance() .getTimeInMillis();
addAuditTrailEntry("startTime: " + startTime);
setVariableData("startTime", Long. toString (startTime) );
                            //]] >
                        </bpelx:exec>-->
                        <!-- BEGIN Inbound Request Processing -->
                        <assign name="Process${operation.upperCase}Request">
                            <copy>
                                <from variable="${operation.name}Request"/>
```

FROM FIG. 4D

```
                <to variable="serviceInRequest"/>
            </copy>
    <% /* Add each SOAP part to the payloadHolder */
        operation.requestPartList.each { part -> %>
            <bpelx:append>
                <bpelx:from variable="serviceInRequest"
part="${part}"/>
                <bpelx:to variable="payloadHolder"/>
            </bpelx:append>
    <% } %>
            <!-- Setup PES Security Header with Timestamp -->
            <bpelx:append>
                <bpelx:from variable="wssHeaderReq"
query="/wsse:Security/wsu:Timestamp"/>

<bpelx:to variable="wssHeaderPesReq"
query="/wsse:Security"/>
            </bpelx:append>
        </assign>
        <!-- END Inbound Request Processing -->

<!--Request PES Processing (For each PES invoked during
the request) -->
    <% /* Add a scope for each Request PES */
        operation.pesRequestList.eachWithIndex { pes, index -> %>
            <!-- BEGIN ${pes.name} Invocation -->
            <scope name="${pes.name}ReqScope${index+1}">
                <variables>
                    <variable name="pesRequest"
messageType="pes:enforcePolicyRequestMsg"/>
                    <variable name="pesResponse"
messageType="pes:enforcePolicyResponseMsg"/>
                    <variable name="attachmentRef" type="xsd:string"/>

<% if (pes.mep == 'async') { %>
```

FROM FIG. 4E

```
        <variable name="pesMessageId"
                element="wsa:MessageID"/>
        <variable name="pesReplyTo"
                element="wsa:ReplyTo"/>
        <variable name="pesRelatesTo"
                element="wsa:RelatesTo"/>
    <% } %>
    </variables>

. . .

</sequence>
</process>
```

AUTOMATED WORKFLOW GENERATION

GOVERNMENT RIGHTS

A portion or all of this disclosure may have been made with Government support under government contract number H98230-09-C-0786, awarded by the National Security Agency of the United States Department of Defense. The Government may have certain rights in this disclosure.

COMPUTER PROGRAM LISTING APPENDIX

A "Computer Program Listing" appendix is submitted on a single compact disk and is incorporated-by-reference of the material on the single compact disk and its duplicate copy.

BACKGROUND

Network security has become increasingly difficult to enforce. As more nodes are used to provide security services, orchestrating communication amongst these nodes has become challenging. Configuring and updating devices that provide orchestration may be cumbersome and very costly. Changes in one part of a system may affect many aspects of coordinating communication amongst nodes of the system.

SUMMARY

In certain embodiments, a method includes accessing a template, the template comprising a plurality of static portions and a plurality of dynamic portions. The method also includes accessing a first set of parameters associated with a first node. The method further includes generating a first set of instructions that configure a device to communicate with the first node. The first set of instructions includes the static portions and the first set of parameters. The first set of parameters are arranged according to the plurality of dynamic portions. The first set of instructions include Business Process Execution Language. The method further includes accessing a second set of parameters associated with a second node that performs a plurality of functions not performed by the first node. Also, the method includes generating a second set of instructions that configure the device to communicate with the second node. The second set of instructions include the static portions and the second set of parameters. The second set of parameters are arranged according to the plurality of dynamic portions. The second set of instructions include Business Process Execution Language.

In certain embodiments, the first set of parameters may be accessed by accessing a first set of files comprising the first set of parameters. The second set of parameters may be accessed by accessing a second set of files comprising the second set of parameters. The plurality of dynamic portions may include one or more scripts. The method may also include generating at least one workflow for the first node, the at least one workflow may include the first set of instructions and the second set of instructions.

In certain embodiments, an apparatus includes at least one non-transitory computer-readable medium comprising a first set of parameters, a second set of parameters, and a template. The apparatus includes at least one processor. The at least one processor is configured to access the template. The template includes a plurality of static portions and a plurality of dynamic portions. The at least one processor is configured to access the first set of parameters. The first set of parameters is associated with a first node. The at least one processor is further configured to generate a first set of instructions that configure a device to communicate with the first node. The first set of instructions includes the static portions and the first set of parameters. The first set of parameters are arranged according to the plurality of dynamic portions. The first set of instructions including Business Process Execution Language. The at least one processor is configured to access the second set of parameters. The second set of parameters are associated with a second node that performs a plurality of functions not performed by the first node. The at least one processor is also configured to generate a second set of instructions that configure the device to communicate with the second node. The second set of instructions include the static portions and the second set of parameters. The second set of parameters are arranged according to the plurality of dynamic portions. The second set of instructions include Business Process Execution Language.

Certain embodiments of the present disclosure may provide one or more technical advantages. In certain embodiments, complex workflows may be generated automatically. Changing the operation of a device that orchestrates communication amongst multiple nodes may be performed efficiently.

Certain embodiments of the present disclosure may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings, in which:

FIGS. 4A-4F illustrate one embodiment of a template;

FIG. 5 is a flowchart illustrating one embodiment of how a workflow may be generated from a template.

DESCRIPTION OF EXAMPLE EMBODIMENTS

Figure 1:
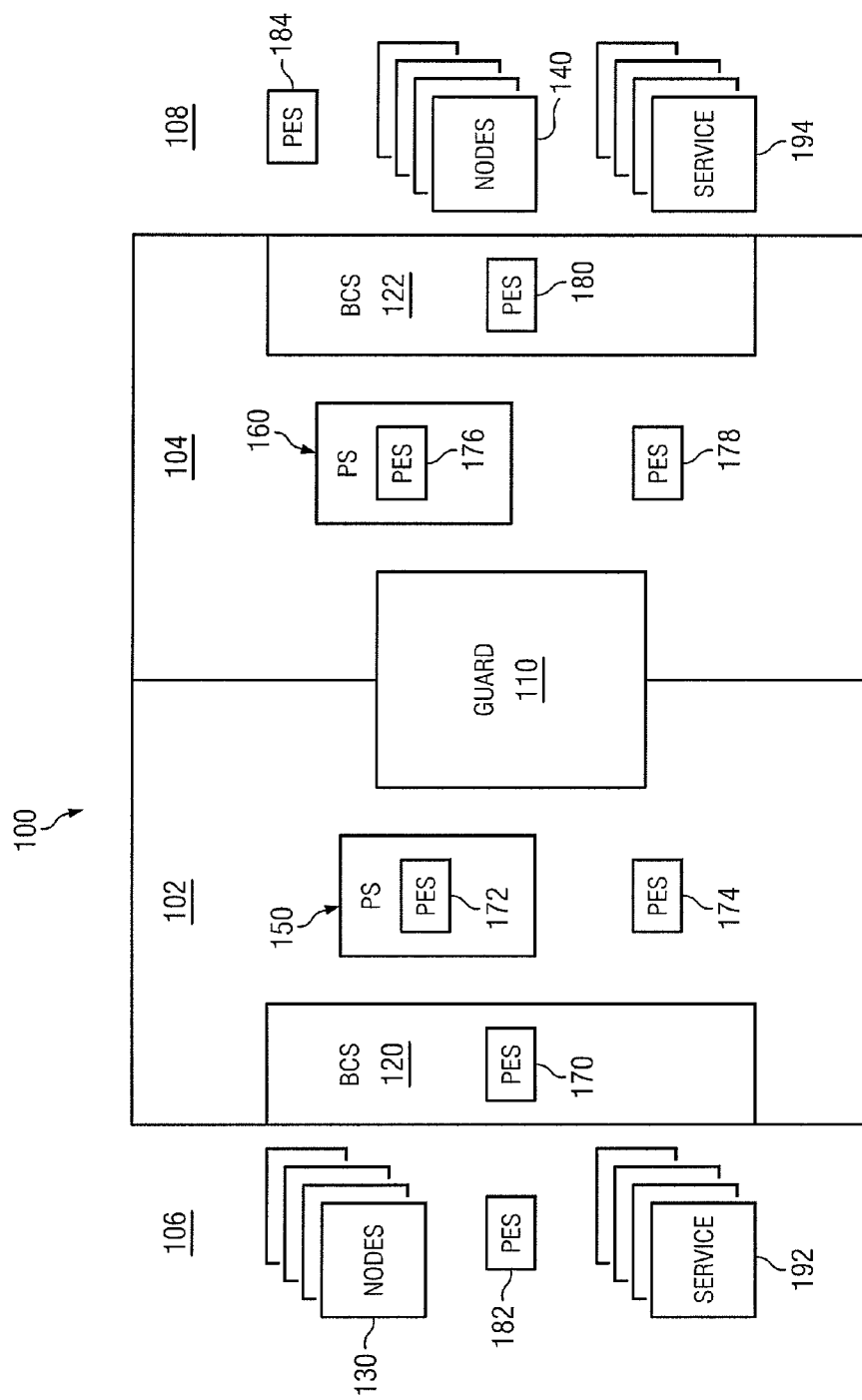
FIG. 1 illustrates an example system for validating network communication.

FIG. 1 illustrates an example system 100 for validating network communication. System 100 includes enclave 102 and enclave 104 separated by guard 110. Communication between enclaves 102 and 104 must pass through guard 110. In system 100, boundary control subsystem 120 separates enclave 102 and external network 106 such that communication between enclaves 102 and 104 passes through boundary control subsystem 120. Similarly, communication between external network 108 and enclave 104 passes through boundary control subsystem 122. Node(s) 130, residing on external network 106, may communicate with node(s) 140, residing on external network 108, in system 100 by having the communication pass through enclaves 102 and 104. Policy subsystem 150 may cause messages to or from nodes 130 to have policy services applied to them. Policy subsystem 160 may cause messages to or from nodes 140 to have policy services applied to them. Policy subsystem 150 and policy subsystem 160 may use a suitable combination of policy enforcement services 170, 172, 174, 176, 178, 180, 182, and 184 to apply the policy services to communication from or to nodes 130 and nodes 140. Policy enforcement services 170, 172, 174, and/or 182 may communicate with one or more of external services 192 (e.g., residing in external network 106) when applying policy services. Policy enforcement services 176, 178, 180, and/or 184 may communicate with one or more of external services 194 (e.g., residing in external network 108) when applying policy services. In some embodiments, system 100 may facilitate communication between nodes 130 and nodes 140 by applying policy services to the messages using one or more of policy enforcement services 170, 172, 174, 176, 178, and 180. Policy subsystems 150 and/or 160 may coordinate the application of the policy services. Guard 110 may verify that the appropriate services have been applied to communications crossing between enclaves 102 and 104. As discussed further below with respect to FIGS. 2-5, policy subsystems 150 and 160 may be configured to communicate with multiple nodes using automatically generated workflows using one or more templates. In some embodiments, this may be advantageous because the orchestration performed by policy subsystems 150 and 160 (as further discussed below with respect to aspects of FIG. 1) may be configured efficiently.

In some embodiments, enclaves 102 and 104 each may include a networked environment such that nodes within each enclave may communicate with each other but not with nodes in other enclaves. For example, policy subsystem 150 and policy enforcement service 174 may communicate directly within enclave 102 but policy subsystem 150 may not communicate directly with policy subsystem 160 because they are in separate enclaves. Enclaves 102 and 104 are configured such that communication between them passes through guard 110. Enclaves 102 and 104 each may include one or more networks. Enclaves 102 and 104 each may be portions of a network, such as a demilitarized zone (DMZ). Enclaves 102 and 104 each may be different domains or in different domains. Enclaves 102 and 104 each may be a segment of a network, that are each defined by security, change and service policies. In some embodiments, enclaves 102 and 104 each may be distinct from a DMZ network in that they each may not be publicly accessible, but instead they each may lie completely within an internal network. Enclaves 102 and 104 each may be associated with different security levels, such as government security levels. For example, enclave 102 may be associated with a government security level of "Confidential" while enclave 104 may be associated with a government security level of "Top Secret." Example security levels that may be associated with enclaves 102 and 104 include protection levels defined by PROTECTING SENSITIVE COMPARTMENTED INFORMATION WITHIN INFORMATION SYSTEMS (DCID 6/3)-MANUAL, dated May 24, 2000, Director of Central Intelligence Directive. Other examples of security levels that may be associated with enclaves 102 and 104 may include those mentioned by the Department of Defense Information Assurance Certification and Accreditation Process (DIACAP). Enclaves 102 and/or 104 may also be implemented using the Secret Internet Protocol Router Network (SIPRNet) and/or the Non-classified Internet Protocol Router Network (NIPRNet). Other example security levels that may be associated with enclaves 102 and 104 include corporate internal networks, secret networks, top secret networks, Automated Teller Machine networks, and bank networks. In some embodiments, guard 110 may be coupled to more than two enclaves (such as enclaves 102 and 104). In such examples, each of the enclaves coupled to guard 110 may include any suitable combination of components such as boundary control subsystems 120 or 122, policy subsystem 150 or 160, policy enforcement services 170, 172, 174, 176, 178, or 180.

In some embodiments, enclaves 102 and 104 as well as external networks 106 and 108 in some embodiments, may be communicative platforms operable to exchange data or information. Enclaves 102 and 104 as well as external networks 106 and 108 may include packet data networks offering communication interfaces or exchanges between nodes in system 100. Enclaves 102 and 104 and external networks 106 and 108 each may be or include any local area network (LAN), metropolitan area network (MAN), wide area network (WAN), wireless local area network (WLAN), virtual private network (VPN), intranet, Internet, plain old telephone system (POTS), or any other appropriate architecture or system that facilitates communications in a network or telephonic environment, including a combination of any networks or systems described above. The networks may also include wireless technology such as WiMAX, LTE, or any of a variety of cellular data networks. In various embodiments, external networks 106 and 108 each may include firewalls or other equipment or software that create security zones and/or secure networks such as DMZs. For example, nodes 130 may be in a different security zone or area than service nodes 192. Similarly, nodes 140 may be in a different security zone or area than service nodes 194.

In some embodiments, guard 110 may be implemented using any suitable combination of hardware, firmware, and software. For example, guard 110 may be implemented using the RAYTHEON HIGH-SPEED GUARD. Guard 110 may provide one or more controlled network interfaces that reviews and releases sensitive data. Guard 110 may facilitate the distribution of information between varied security classification environments, provide effective interoperability across domains, and/or serve as a link to ensure that data maintains sensitivity levels in information-sharing and transmission processes that occur across domains. Guard 110 may provide certain aspects of memory and processing isolation between data that is received from different network interfaces. Guard 110 may include parallel computer architecture, such as processors, memory modules, and disk storage modules to provide this isolation. Guard 110 may provide Extensible Markup Language (XML) validation and/or protocol header validation and sanitization.

In some embodiments, boundary control subsystems 120 and 122 each may be implemented using any suitable combination of hardware, firmware, and software. The hardware, firmware, or software may include firewalls, intrusion detection systems, gateways (such as a Layer 7 Gateway), authentication modules, and/or other suitable security frameworks. As illustrated in FIG. 1, boundary control subsystems 120 and 122, in some embodiments, may include one or more policy enforcement services (such as policy enforcement services 170 and 180). The one or more policy enforcement services in boundary control subsystems 120 and 122 may be configured as software modules integrated with other components of boundary control subsystems 120 and 122 or they may be a separate hardware, virtual machine, or software module from other aspects of boundary control subsystems 120 and 122. In some embodiments, policy enforcement services 170 and 180 may have different access rights, privileges, trust levels, or other form of security credentials than policy enforcement services 172, 174, 176, and 178. For example, one of nodes 130 may send a Simple Object Access Protocol (SOAP) request destined for one of nodes 140. The request may enter boundary control subsystem 120 and first pass through a firewall, intrusion detection system, and/or intrusion protection system. The request may then pass through a Layer 7 gateway within boundary control subsystem 120 before being sent to policy subsystem 150.

Boundary control subsystems 120 and 122 may be configured to authenticate credentials (i.e., using client certificates) of nodes 130 and 140, perform schema validations on received communications, and generate unique message identifiers for communications sent to policy subsystems 150 and/or 160. For example, if boundary control subsystem 120 detects that a message from node 130 does not have correct XML syntax, boundary control subsystem 120 may reject the message and not allow it to continue into enclave 102. As another example, boundary control subsystem 120 may receive a communication from one of nodes 130 destined for one of nodes 140 that has a message identifier. Boundary control subsystem 120 may replace the message identifier with a different message identifier generated by boundary control subsystem 120. When boundary control subsystem 122 receives the message, boundary control subsystem 122 may send the message to its destination (one of nodes 140).

In some embodiments, nodes 130 and 140 each may be implemented using any suitable combination of hardware, firmware, and software. Each of nodes 130 and 140 may be a personal computer, a cellular telephone, an electronic notebook, a laptop, a personal digital assistant (PDA), smartphone, a server, a virtual machine, an e-reader, a router, a database, or other items that communicate in a network. Nodes 130 may be configured to send or receive communication from nodes 140. For example, one or more of nodes 130 may be clients requesting a file or service from nodes 140. In such examples, one or more of nodes 140 may include a server configured to respond to requests from nodes such as nodes 130. Nodes 130 and 140 may implement or be a part of messaging environments. Suitable messaging environments include, but are not limited to, an e-mail environment, an enterprise messaging environment, an instant messaging environment, a peer-to-peer messaging environment, a chat environment, or other messaging environments. Communication between nodes 130 and 140 may be used in other contexts, such as File Transfer Protocol (FTP) sessions, Web sessions, Wiki sessions, online message boards (such as forums), or other interactive environments. Nodes 130 and 140 may also communicate regarding sending or receiving sensitive or private information. For example, one or more of nodes 130 may request confidential information from one or more of nodes 140 or may transmit confidential information to be stored at one or more of nodes 140. Information transmitted between nodes 130 and 140 may include sensor information, satellite imagery, technical configurations, plans, and reports. Some or all of the information transmitted between nodes 130 may be confidential, privileged, or classified.

For example, one of nodes 130 may be a mobile device, such as a smart phone (e.g. an APPLE IPHONE, a GOOGLE ANDROID device, or a RESEARCH IN MOTION BLACKBERRY device). The mobile device may desire to send data (such as an image, message, geographical, text, audio, video, and binary data) to one of nodes 140. The mobile device may send the data to another one of nodes 130, such as a FTP proxy. The data from the mobile device may then be stored at another one of nodes 130, such as an FTP server. A polling service may operate on another one of nodes 130 that detects the data from the mobile device being stored at the FTP server. The service may then be configured to retrieve the data from the FTP server and send it to boundary control subsystem 120 such that it may be processed and delivered to its destination at one of nodes 140 as described below. The service may be configured to use Web services, such as SOAP, SOAP with attachments, Remote Procedure Calls (RPC), Web Services Addressing (WS-Addressing), encryption protocols (such as XML encryption, Transport Layer Security (TLS), and/or Secure Sockets Layer (SSL)), Java Message Service (JMS), XML-formatted messages or documents, Asynchronous Javascript and XML (AJAX), and other suitable protocols. This example illustrates how a mobile device in a network with a low or public security level may send data or messages to a node in a network with a high, private, or confidential security level.

As another example, one of nodes 140 may communicate a message and/or data (such as an image, message, geographical, text, audio, video, and binary data) to one or more of nodes 130, such as a mobile device. The mobile device may be a smart phone (e.g. an APPLE IPHONE, a GOOGLE ANDROID device, or a RESEARCH IN MOTION BLACKBERRY device). The communication from one of nodes 140 may be in a Web services protocol, such as SOAP, SOAP with attachments, RPC, WS-Addressing, encryption protocols (such as XML encryption, TLS, and/or SSL), JMS, XML-formatted messages or documents, AJAX, and other suitable protocols. The communication may go through boundary control subsystem 122 and be processed by the nodes in enclaves 104 and 102 as discussed below (such as being processed by guard 110). The communication may be sent from boundary control subsystem 120 to one of nodes 130, such as a server. The server may then communicate the communication to the mobile device (which is one of the nodes 130). The server may communicate the message using a text message, e-mail, or other suitable communication protocols. This example illustrates how a node in a network with a high, private, or confidential security level may send data or messages to a mobile device in a network with a low or public security level.

In some embodiments, policy subsystems 150 and 160 each may be implemented using any suitable combination of hardware, firmware, and software. Policy subsystem 150 may be configured to receive communication from nodes 130 and determine what actions or services should be performed on the communication in order for guard 110 to validate the communication. Similarly, policy subsystem 160 may be configured to receive communication from nodes 140 and determine what actions should be performed on the communication in order for guard 110 to validate the communication. Policy subsystems 150 and 160 may use one or more policies to determine which services should be performed on communication. For example, the policies may specify one or more services to be applied to the communication based on the type of communication, the source of the communication, the destination of the communication, or the content of the communication. Policy subsystems 150 and 160 may be configured to invoke one or more of policy enforcement services 170, 172, 174, 176, 178, 180, 182, and 184 when applying one or more services to communication from nodes 130 or 140. Policy subsystems 150 and 160 may schedule the application of services amongst policy enforcement services 170, 172, 174, 176, 178, 180, 182, and 184 and receive the results of the application of those services. Policy subsystems 150 and 160 may bundle assertions regarding the application of services received from one or more of policy enforcement services 170, 172, 174, 176, 178, 180, 182, and 184 to the communication and provide the bundle to guard 110. For example, policy subsystems 150 and 160 each may be an orchestrator that manages the application of policy enforcement services.

In some embodiments, policy enforcement services 170, 172, 174, 176, 178, 180, 182, and 184 each may be implemented using any suitable combination of hardware, firmware, and software. They each may offer services used to analyze communication between nodes 130 and 140. Examples of such services may include: type validation (ensuring that data is of the type it asserts itself to be), data transformation (modifying the payload in accordance with a policy, such as stripping addresses or other sensitive data), malware detection, keyword scanning, dirty word detection, sanitization, transformation, validation, scanning for sensitive or confidential information, analysis of the source or destination of the communication, determination of whether the communication conforms to one or more government security protocols, and verification of security or authentication information (such as certificates, signatures, user name and password combinations, and hashes).

Each of policy enforcement services 170, 172, 174, 176, 178, 180, 182, and 184 may have a parameter, such as a private key or digital signature. For example, this may be an RSA-1024 signature. After determining results of applying one or more services, each of policy enforcement services 170, 172, 174, 176, 178, 180, 182, and 184 may return assertions to policy subsystems 150 and 160 representative of the results. Such assertions may be signed or authenticated using the private key or digital signature particular to the policy enforcement service sending the assertion. One or more of policy enforcement services 170, 172, 174, 176, 178, 180, 182, and 184 may perform a hash of the assertion. Each of policy enforcement services 170, 172, 174, 176, 178, 180, 182, and 184 may send such assertions, hashes of assertions, and/or digitally authenticated assertions to policy subsystems 150 and/or 160.

FIG. 1 provides various example locations for the policy enforcement services. A policy enforcement service may be located within enclaves 102 and/or 104 (such as policy enforcement services 174 and 178). A policy enforcement service may be colocated or a part of policy subsystems 150 and/or 160 (such as policy enforcement services 172 and 176). A policy enforcement service may also be colocated or within boundary control subsystems 120 and/or 122 (such as policy enforcement services 170 and 180). A policy enforcement service may be located outside of enclaves 102 and/or 104 and in external networks 106 and/or 108 (such as policy enforcement services 182 and 184). The above locations are merely examples of where a policy enforcement service may be situated within system 100. Additionally any suitable combination of the above (and other) locations may be used in various embodiments of system 100.

In some embodiments, external services 192 and 194 each may be implemented using any suitable combination of hardware, firmware, and software. External service 192 may reside in external network 106 and not enclave 102. Similarly, external service 194 may reside in external network 108 and not enclave 104. Root certificates and/or other authentication parameters regarding external services 192 and 194 may be stored at boundary control subsystems 120 and/or 122 (such as using X.509 credentials). External services 192 and 194 each may be used by one or more of policy enforcement services 170, 172, 174, 176, 178, 180, 182, and 184 when they apply services to communication between nodes 130 and 140. For example, external services 192 and 194 may provide services such as access to databases located outside of enclaves 102 and 104, enterprise services, authentication services, malware detection, and other suitable services. This may be advantageous, in some examples, in that services not available in enclaves 102 and 104 may be used to provide analysis to communication between nodes 130 and 140 that would otherwise not be available.

An example of such a service is the Web Service for All-Source Releasability and Dissemination (WiSARD) deployed by National Geospatial-Intelligence Agency (NGA). WiSARD may provide the capability for enforcing complex and evolving release and distribution policies of intelligence products. WiSARD may determine the releasability of a file based on metadata associated with the file. Another example of such a service is a malware detection system implemented using a cluster of detection technologies, such as RAYTHEON'S RSHIELD system.

An example operation of system 100 processing a request for data is now described. A node 130 (in this example referred to as a "client") may send a request destined for a node 140 (in this example referred to as a "server") requesting data such as image data. In this example, the client is associated with enclave 102 while the server is associated with enclave 104. In this example, enclave 104 has a security level that is higher than enclave 102. The request by the client first enters boundary control subsystem 120 where the client's credentials are authenticated. Boundary control subsystem 120 also creates a unique message identifier for the request and sends it to policy subsystem 150.

Policy enforcement service 170 may generate an assertion after analyzing the request and send the assertion (or a hashed and/or digitally signed or encrypted assertion) to policy subsystem 150. Policy subsystem 150 may request one or more of policy enforcement services 174 to apply policy services to the request based on one or more policies selected by policy subsystem 150. In this example, policy subsystem 150 requests that a validation service provided by one policy enforcement service 174 and a Schematron service (i.e., a rule-based validation service regarding patterns in XML trees) provided by another policy enforcement service 174 be applied to the client's request. Policy subsystem 150 receives the results of these policy enforcement services applying these services and bundles the assertions (or hashed and/or encrypted versions of the assertions) from policy enforcement services 170 and 174 with the client's request. Policy subsystem 150 sends the bundle to guard 110.

In this example, guard 110 analyzes the request and selects a policy appropriate to the client's request. Using the policy, guard 110 validates the bundle of assertions (or hashed and/or encrypted assertions) received from policy subsystem 150. Guard 110 may also validate the order of the assertions. Guard 110 then removes the bundled assertions from the client's request and attaches an assertion (that may be hashed or encrypted) indicating the approval of guard 110 to the client's request and sends the request to policy subsystem 160. Policy subsystem 160 may send the client's request with the assertion of guard 110 to boundary control subsystem 122. In some embodiments, policy subsystem 160 may apply policy enforcement services to the client's request before sending the client's request to boundary control subsystem 122. The client's request may have the unique identifier provided by boundary control subsystem 120 when arriving at boundary control subsystem 122. Boundary control subsystem 122 may then send the client's request without the assertion of guard 110 to the server (i.e., one of nodes 140 as discussed above). In some embodiments, boundary control subsystem 122 may validate and remove assertions that may be part of the message or included in a package with the message, such as assertions from guard 110 or policy enforcement services invoked by policy subsystem 160.

In this example, the server sends a response destined for the client (i.e., one of nodes 130 as discussed above) that includes the requested image data. The response is received at boundary control subsystem 122. Boundary control subsystem 122 may analyze the response and determine it is suitable to send the response to policy subsystem 160. Boundary control subsystem 122 may authenticate the credentials of the server and may perform a schema validation. Boundary control subsystem 122 may generate a unique identifier for the response or may apply the same identifier for the response and was used in the request and send this to policy subsystem 160.

Policy enforcement service 180 may send an assertion (that may be encrypted and/or hashed) to policy subsystem 160 indicating what policy services were performed at boundary control subsystem 122. Policy subsystem 160 selects one or more policies in response to analyzing the response. Policy subsystem 160 determines that the response should be sent to a validation service and to a WiSARD service. In this example, the WiSARD service is implemented as an external service 194. Policy subsystem 160 may send requests to have these services performed on the responses to one or more policy enforcement services 178. One policy enforcement service 178 may perform the validation service and return an assertion (that may be encrypted and/or hashed) to policy subsystem 160. Another policy enforcement service 178 may send a request in an appropriate format to the WiSARD service (which is implemented at a node of external services 194). The request to the WiSARD service may go through (and be validated by) boundary control subsystem 122. The WiSARD service may communicate its response back to the policy enforcement service 178 that requested the service. This response may also go through (and be validated by) boundary control subsystem 122. After receiving the results from the WiSARD service, policy enforcement service 178 develops one or more assertions that reflect the received results. Policy enforcement service 178 sends the assertions (that may be encrypted and/or hashed) to policy subsystem 160.

In this example, after receiving responses to all the requests for services sent by policy subsystem 160, policy subsystem 160 bundles the assertions (or hashed and/or encrypted versions of the assertions) from policy enforcement services 178 and 180 with the server's response. Policy subsystem 160 sends the bundle to guard 110. Guard 110 analyzes the server's response and selects an appropriate policy. Using the policy, guard 110 validates the bundle of assertions (or hashed and/or encrypted assertions) received from policy subsystem 160. Guard 110 then removes the bundled assertions from the server's response and attaches an assertion (that may be hashed or encrypted) indicating the approval of guard 110 to the server's response. Guard 110 sends the bundle to policy subsystem 150. Policy subsystem 150, after analyzing the server's response, validates the assertion of guard 110. After validating the assertion of guard 110, policy subsystem 150 may send the server's response with the assertion of guard 110 to boundary control subsystem 120. The response may include the unique identifier generated by boundary control subsystem 122. Boundary control subsystem 120 may then send the server's response without the assertion of guard 110 to the client (i.e., node 130 as discussed above).

The example described above may also be used with services other than WiSARD, such as a malware detection service. For example, a malware detection service that receives requests and sends responses using Web services, SOAP, SOAP with attachments, RPC, WS-Addressing, encryption protocols (such as XML encryption, TLS, and/or SSL), JMS, XML-formatted messages or documents, and/or AJAX may be used in system 100 according to the example described above.

Figure 2:
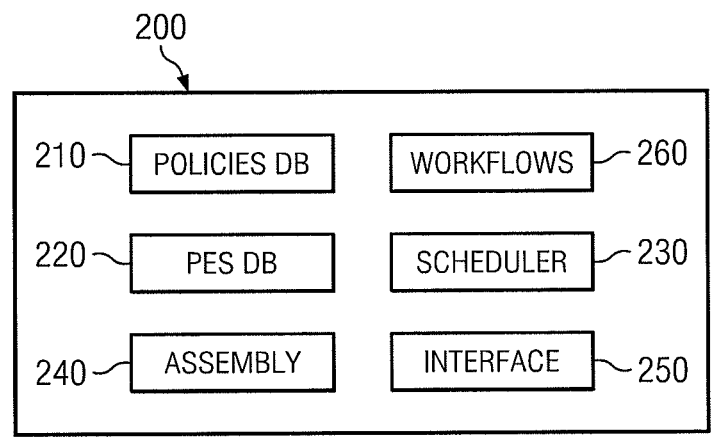
FIG. 2 is a block diagram of one embodiment of a policy subsystem.

FIG. 2 is a block diagram of one embodiment of a policy subsystem 200. Some or all of the components of policy subsystem 200 may be used, in some embodiments, to implement policy subsystem 150 and/or 160 of FIG. 1. Policy subsystem 200 may include policies database 210, policy enforcement services database 220, scheduler module 230, assembly module 240, interface 250, and workflows 260. Blocks 210, 220, 230, 240, 250, and 260 each may be implemented using any suitable combination of hardware, firmware, and software. Blocks 210, 220, 230, 240, 250, and 260 each may reside on the same hardware, different hardware, or be combined in any suitable combination of hardware devices.

In some embodiments, policies database 210 may include policies used by policy subsystem 200 when analyzing messages received at interface 250. Such policies may include what services should have been applied to the communication in order to validate the communication. The policies may also specify an order in which the services should be applied to the communication. In addition, the policies may state which policy enforcement services (such as policy enforcement services 170, 172, 174, 176, 178, and 180 of FIG. 1) should be used to apply the services to the communication. Policies in policies database 210 may be configured as a series of branch determinations. The policies may use a series of conditional "if" statements to direct the operation of policy subsystem 200. For example, a policy may specify that if a policy enforcement service (such as policy enforcement service 172 of FIG. 1) indicates that a message did not pass a "dirty word" check, the policy may specify not to allow the message to continue. As another example, a policy may specify that if a message is determined to have a "dirty word," but the message is from and/or to one or more particular users, then the message should be allowed to proceed.

In some embodiments, policy enforcement service database 220 may include information regarding policy enforcement services that may be applied to messages received at interface 250. For example, if interface 250 is coupled to enclave 102 of FIG. 1, policy enforcement service database 220 may include information regarding policy enforcement services 170, 172, 174, and 182 of FIG. 1. If interface 250 is coupled to enclave 104 of FIG. 1, policy enforcement service database 220 may include information regarding policy enforcement services 176, 178, 180, and 184 of FIG. 1. Examples of information included in policy enforcement service database 220 include identification information, network location information (such as addresses), encryption parameters, digital signatures, private and public keys, hash parameters, available services, and other suitable information regarding policy enforcement services.

In some embodiments, scheduler module 230 may be configured to determine what services should be applied to communication received at interface 250. Scheduler module 230 may retrieve one or more policies from policies database 210 and compare attributes of the communication to the retrieved policies to determine the services that should be applied to the communication. Scheduler module 230 may determine an order that the services should be applied to the communication based on the information from the selected policies. Scheduler module 230 may be configured to access information in policy enforcement service database 220 when determining which policy enforcement service to invoke with respect to the communication and in what order each policy enforcement service should be invoked. For example, scheduler module 230 may determine that certain services should be applied to a message received at interface 250 but that the services need to occur in a particular order because one policy enforcement service may apply a service to both the message and the results of applying another service to the message.

Using the information in policy enforcement service database 220, scheduler module 230 may identify appropriate policy enforcement services that may perform the services it has determined according to the policies in policies database 210 and cause requests to be sent to the determined policy enforcement service through interface 250.

In some embodiments, assembly module 240 may be configured to gather responses from policy enforcement services to requests sent by scheduler module 230. Assembly module 240 may receive responses from interface 250 and apply them to the message undergoing analysis to form a package. For example, the responses received by assembly module 240 may be tokens that include assertions that have been encrypted or digitally signed (and, in some cases, hashed) from various policy enforcement services. Assembly module 240 may use the information in either or both of policies database 210 and policy enforcement service database 220 to form the packages. For example, assembly module 240 may determine from the information in databases 210 and/or 220 that the responses from the policy enforcement service should be applied to the message undergoing analysis in a particular order. Assembly module 240 may then package the responses to the message in accordance with the determined order. In some embodiments, assembly module 240 may determine the order in which to package the responses with the message from scheduler module 230. After all the policy enforcement services respond to the requests sent by scheduler module 230, assembly module 240 may form the package and send it to another node for verification through interface 250. For example, assembly module 240 may send the package to guard 110 of FIG. 1.

In some embodiments, interface 250 may be a network interface configured to receive and send messages as described above with respect to scheduler module 230 and assembly module 240. Interface 250 may be configured to communicate using one or more networking protocols, such as Internet or Web protocols. For example, interface 350 may communicate using Web services, SOAP, SOAP with attachments, RPC, WS-Addressing, encryption protocols (such as XML encryption, TLS, and/or SSL), JMS, XML-formatted messages or documents, AJAX, and other suitable protocols.

In some embodiments, workflows 260 may be used to configure policy subsystem 200 to communicate with multiple nodes, such as policy enforcement services 170, 172, 174, and 182 of FIG. 1. Workflows 260 may be implemented using Business Process Execution Language (BPEL) flows. For example, workflows 260 may include information as to the type of messages to send, when to send messages, where to send messages, and how to send messages to nodes such as policy enforcement services 170, 172, 174, and 182 of FIG. 1.

Figure 3:
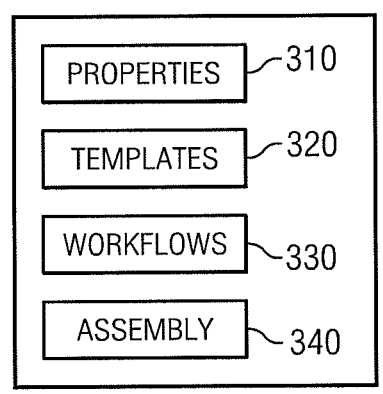
FIG. 3 is a block diagram illustrating one embodiment of a template engine.

FIG. 3 illustrates one embodiment of template engine 300. Template engine 300 may include properties files 310, templates 320, workflows 330, and assembly module 340. In some embodiments, template engine 300 may be configured to create workflows 330 by processing templates 320 using assembly module 340 and the information stored in properties files 310.

In some embodiments, properties files 310 include information or parameters regarding one or more nodes involved in workflows 330. For example, if a template 320 was used to configure policy subsystem 150 of FIG. 1 to communicate with one or more of policy enforcement services 170, 172, 174, and 182 of FIG. 1, information in properties files 310 may include parameters regarding policy subsystem 150, policy enforcement services 170, 172, 174, and 182, or enclave 102 (of FIG. 1). Properties files 310 may be implemented using one or more files, databases, in-memory structures or objects, or other suitable information storage structures or techniques. Examples of parameters that may be stored in properties files 310 include a name of a service, an address of a service, a version of a service, a port type used by a service, protocol or conventions to use when communicating with a service, properties of a service, environment properties, and network properties. An example of a properties file 310 for an example policy enforcement service called "Magic Eight Ball":

(See Computer Program Listing #1 in the Appendix)

In some embodiments, one or more templates 320 may be used to generate workflows 330. In some embodiments, each of templates 320 may include static and dynamic portions that assembly module 340 uses to generate workflows 330. The dynamic portions of templates 320 may include script, portions of script, or code (including code that may need to be compiled) that is processed by assembly module 340 to dynamically create instructions in workflows 330. Examples of the content of dynamic portions include PYTHON scripts, GROOVY scripts, PERL scripts, JAVA code, and C++ code. Template 400 of FIGS. 4A-4F is an example of an implementation of a template 320. Templates 320 may be stored using one or more files, databases, in-memory structures or objects, or other suitable information storage structures or techniques.

In some embodiments, workflows 330 may include instructions that configure a device to communicate with one or more services. As an example, the instructions may be configured as BPEL statements. Other suitable instruction formats may be used. Workflows 330 may be stored using one or more files, databases, or other suitable information storage structures or techniques. The following example of a workflow 330 may be used to configure policy subsystem 150 to communicate with policy enforcement service 170 called "Magic Eight Ball":

(See Computer Program Listing #2 in the Appendix)

Assembly module 340, in some embodiments, may be implemented using any suitable combination of hardware, firmware, and software. For example, assembly module 340 may be implemented using the GROOVY SIMPLE TEMPLATE ENGINE. Assembly module 340 may be configured to parse templates 320 to generate workflows 330. For example, assembly module 340 may be invoked by providing it a template 320 and one or more of properties files 310. Properties files 310 may be provided to assembly module 340 as one or more in-memory objects with key-value pairs as parameters. In some embodiments, assembly module 340 may be provided with one or more of properties files 310 in the form of files on a disk or in the form of references to the location of one or more of properties files 310 on a local or remote storage location.

FIGS. 4A-4F illustrate one embodiment of template 400. Template 400 is an example of a template that may be used to create a workflow for a node (such as policy subsystem 150 of FIG. 1) to communicate with policy service providers (such as may be used to create a workflow for policy enforcement services 170, 172, 174, and 182 of FIG. 1) using parameters of the policy service providers (such as information included in properties files 310 of FIG. 3). In the illustrated embodiment, template 400 may be used to generate BPEL workflows. In some embodiments, other workflows or sets of instructions may be generated using the structures and/or techniques present in template 400 discussed further below.

In some embodiments, portion 402 is an example of a dynamic portion of template 400. Portion 402 includes BPEL statements, some of which are not complete because they require information. For example, the "process name" statement is set to "${orch.name}" indicating that a parameter must be retrieved from a source such as properties files 310 or in operating memory to supply a value for the process name when creating instructions from portion 402 of template 400. In some embodiments, this is an example of how a dynamic portion of template 400 may arrange parameters within instructions generated using template 400.

In some embodiments, portion 404 is an example of a static portion of template 400. Portion 404 includes BPEL statements that are complete and do not need any script or code executed or information from outside template 400 to generate the instructions. For example, when parsing portion 404 of template 400, instructions for a workflow may be generated by copying the statements in portion 404 into the workflow.

In some embodiments, portion 406 is another example of a dynamic portion of template 400. Portion 406 includes the use of scripts or portions of scripts to generate appropriate instructions by providing conditional statements. The script or portions of scripts used in portion 406 are delimited using the "<%" and "%>" characters in this example. In this example, the scripts are written using the GROOVY language. Portion 406 includes conditional statements that are used to generate certain instructions depending on the existence of certain conditions. For example, a script portion is used to determine if asynchronous communication is available. If so, then portion 406 provides further instructions that adds a BPEL partnerLink role. In this example, the instructions added to the workflow when asynchronous communication is available are generated by accessing certain parameters, such as the name of the service that will be communicated with using the generated workflow (denoted by the phrase "$ {service.name}"). In some embodiments, using conditional statements is an example of how a dynamic portion of template 400 may arrange parameters within instructions generated using template 400.

In some embodiments, portion 408 is another example of a dynamic portion of template 400. Portion 408 includes the use of scripts or portions of scripts to generate appropriate instructions by using a loop mechanism. The script or portions of scripts used in portion 408 are delimited using the "<%" and "%>" characters in this example. In this example, the scripts are written using the GROOVY language. In portion 408, a looping mechanism generates BPEL PartnerLink instructions for each policy enforcement service (phrased as "PES" or "pes" in portion 408) detected. In this example, the instructions added to the workflow using the loop mechanism are generated by accessing certain parameters, such as the name of the policy enforcement service that will be communicated with using the generated workflow (denoted by the phrase "$ {pes.name}"). In some embodiments, using loop mechanisms is an example of how a dynamic portion of template 400 may arrange parameters within instructions generated using template 400.

Portions 402, 404, 406, 408 are examples of the structures and techniques used throughout template 400. In some embodiments, portions 402, 404, 406, 408 illustrate how template 400 combines static and dynamic portions to facilitate a flexible and efficient manner of generating a workflow.

Figures 4F, 5:
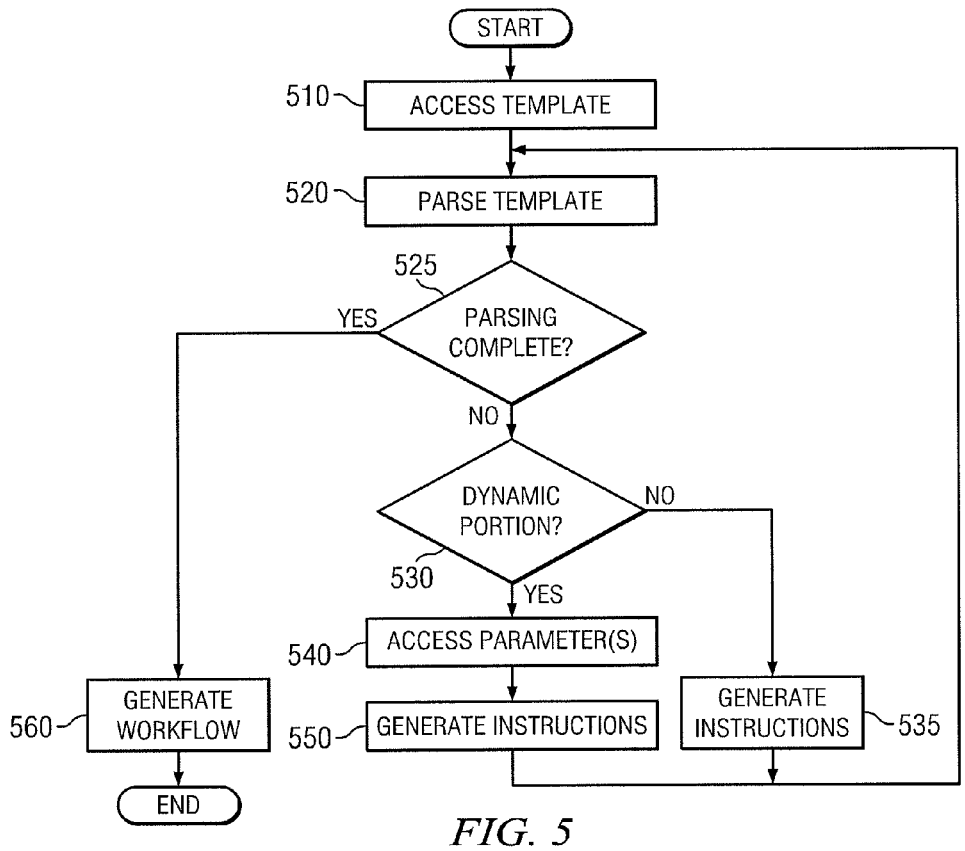

FIG. 5 is a flowchart illustrating one embodiment of how a workflow may be generated from a template. In general, the steps illustrated in FIG. 5 may be combined, modified, or deleted where appropriate, and additional steps may also be added to the example operation. Furthermore, the described steps may be performed in any suitable order. In some embodiments, the steps described below may be performed by any suitable combination of the elements discussed above with respect to FIGS. 1-4F and 6. In some embodiments, workflows (such as workflows 330 of FIG. 3) generated using some or all of the steps of FIG. 5 may configure a device to communicate with one or more service providers. For example, policy subsystem 150 may be configured to communicate with any of policy enforcement services 170, 172, 174, and 182 of FIG. 1 using workflows 330 generated according to the steps below. In some embodiments, workflows generated according to the steps below may be used in other suitable contexts. As an example, the steps of FIG. 5 are discussed below with respect to assembly module 340 of FIG. 3. In some embodiments, the steps of FIG. 5 may be performed using any suitable combination of hardware, firmware, or software other than those mentioned in FIG. 3.

At step 510, in some embodiments, assembly module 340 accesses one of templates 320 of FIG. 3. Template 320 may be read from local or remote memory or other storage structures. Template 320 may include static portions and dynamic portions.

At step 520, in some embodiments, template 320 is parsed by assembly module 340. Parsing may include analyzing the contents of template 320 and taking suitable actions in order to construct one of workflows 330, as described further below. The parsing may be performed sequentially, serially, or in parallel. In some embodiments, multiple threads or processes may be used to perform the parsing. Parsing may be performed using distributed computing or computing clusters.

At step 525, in some embodiments, assembly module 340 determines whether the parsing has been completed. For example, if template 320 is being parsed sequentially, parsing may be complete if the end of template 320 has been reached. As another example, if template 320 is being parsed using parallel processing or if it is being parsed non-sequentially, then it may be determined whether all of the template has been parsed at this step. If it is determined that parsing is complete, then step 560 may be performed. If it is determined that parsing is not complete, then step 530 may be performed.

At step 530, in some embodiments, assembly module 340 determines whether a dynamic portion of template 320 is being parsed. Template 320 may include static portions or dynamic portions. For example, a static portion may include information that may be used to generate instructions (such as workflow instructions) without needing to access information outside of template 320. In some embodiments, a dynamic portion of template 320 may be used to generate instructions (such as workflow instructions) by determining information from other files or by executing, compiling, or interpreting information in the dynamic portion. For example, a dynamic portion may include one or more scripts (e.g., using the Groovy language), scriptlets, or other executable code that may or may not need to be compiled. If it is determined that a dynamic portion of template 320 is being parsed, then step 540 may be performed. If it is determined that a static portion of template 320 is being parsed, then step 535 may be performed.

At step 535, in some embodiments, assembly module 340 generates instructions from a static portion of template 320. The instructions generated at this step may be workflow instructions, such as Business Process Execution Language (BPEL) instructions. For example, the instructions may be generated by copying some or all of the static portion of template 320. After step 535 is performed, assembly module may return to step 520.

At step 540, in some embodiments, one or more parameters are accessed by assembly module 340. Assembly module 340 may access the parameters in accordance with the content of the dynamic portion of template 320 parsed at step 530. For example, the dynamic portion may specify a particular parameter that should be used to generate an instruction. As another example, the dynamic portion may condition the generation of one or more instructions based on the content of one or more parameters. As another example, the dynamic portion may generate different types of instructions depending on the value of one or more parameters. In some embodiments, the parameters may be accessed from one or more files, such as properties files 310 of FIG. 3 or from one or more objects or other suitable structures in memory. Key-value pairs may be used to access the parameter(s). Examples of parameter(s) that may be accessed in this step include a name of a service, an address of a service, a version of a service, a port type used by a service, protocol or conventions to use when communicating with a service, properties of a service, environment properties, and network properties, or other parameters discussed above with respect to FIG. 3.

At step 550, in some embodiments, assembly module 340 generates instructions. In some embodiments, the instructions may be a portion of or complete BPEL statement(s) that include the information accessed at step 540. The parameter(s) accessed at step 540 may be arranged in accordance with the dynamic portion of template 320 determined at step 530. For example, the dynamic portion may include one or more variables whose value is set to or based on the parameters accessed at step 540, such as placing a variable for a network address of a policy enforcement service in the appropriate portion of an instruction that directs communication to the policy enforcement service. As another example, the dynamic portion may generate different instructions based on the value of the parameter(s) accessed at step 540, such as generating different type of communication instructions depending on whether the parameter(s) indicate a policy enforcement service communicates in an asynchronous manner or not. One or more variables accessed at step 540 may indicate the type of service offered and/or the name of the service offered by a policy enforcement service. The dynamic portion of template 320 may use the type of service or the name of the service when creating instructions for communicating with the service. The parameters may also indicate a manner in which a service operates. For example, a timeout value may be specified. The dynamic portion may include one or more instructions that indicate when communication with the service should occur based on the timeout value. The foregoing are only examples of how the parameter(s) accessed at step 540 may be arranged in accordance with the dynamic portion of template 320 in the instructions generated at step 550. Other suitable arrangements may be used as well, such as those indicated by template 400 of FIGS. 4A-4F. After step 550 is performed, in some embodiments, then assembly module 340 performs step 520 to continue parsing template 320.

At step 560, in some embodiments, assembly module 340 generates a workflow, such as workflow 330 of FIG. 3. This may occur by collecting and arranging the instructions generated at steps 535 and 550. The workflow generated at step 560 may be a BPEL workflow. Assembly module 340 may reach step 560 after having parsed all of template 320. In some embodiments, generating a workflow in the manner described by the steps of FIG. 5 may provide advantages. For example, workflows for a variety of services may be generated efficiently by specifying certain parameters for each of the services. As another example, a workflow for communicating with a service that has changed may be generated efficiently by modifying the parameters for the changed service.

Figure 6:
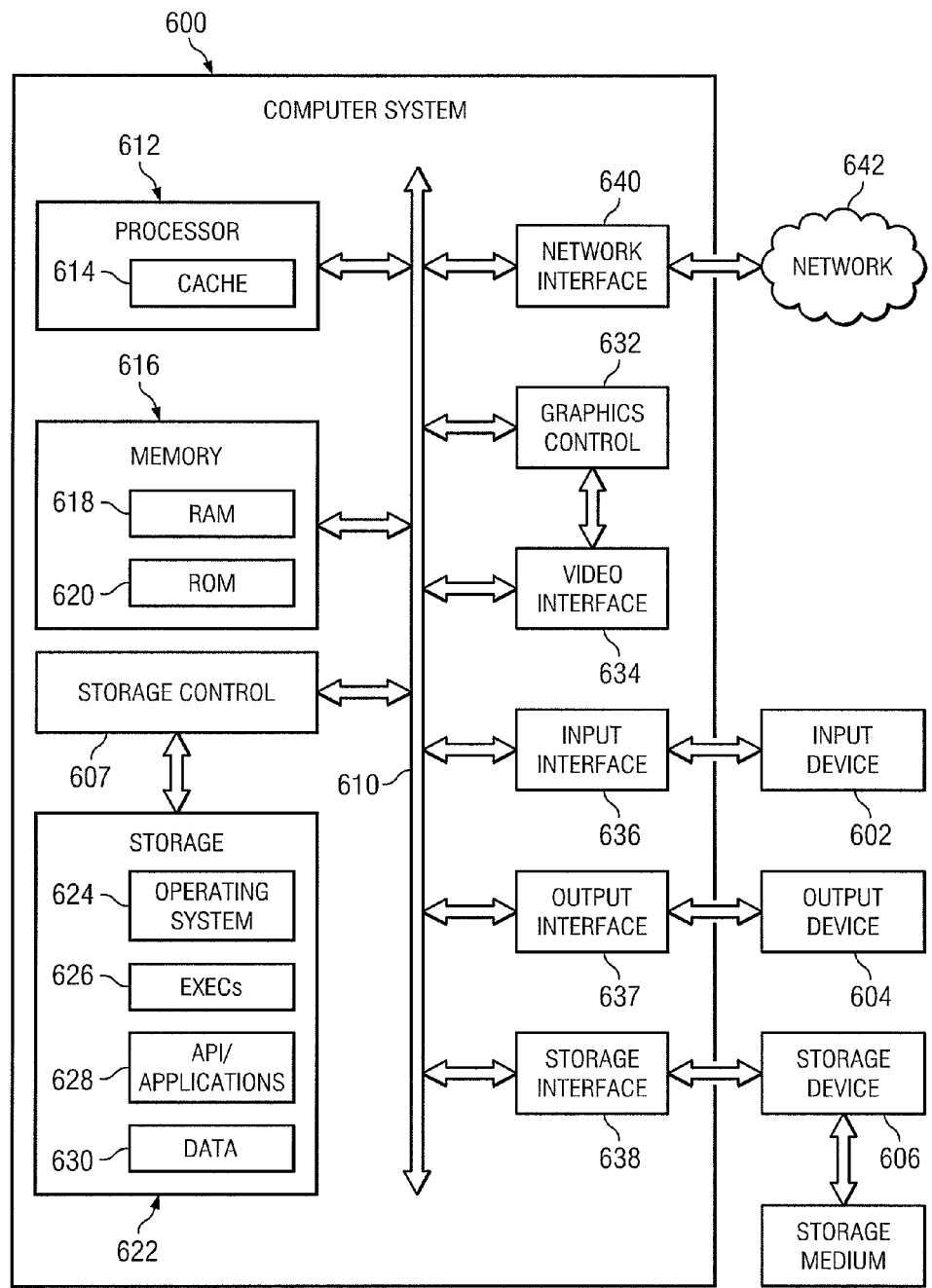
FIG. 6 illustrates an example computer system suitable for implementing one or more portions of particular embodiments.

FIG. 6 illustrates an example computer system 600 suitable for implementing one or more portions of particular embodiments. Although the present disclosure describes and illustrates a particular computer system 600 having particular components in a particular configuration, the present disclosure contemplates any suitable computer system having any suitable components in any suitable configuration. Moreover, computer system 600 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. One or more components or steps of FIGS. 1-5 may be implemented using all of the components, or any appropriate combination of the components, of computer system 600 described below.

Computer system 600 may have one or more input devices 602 (which may include a keypad, keyboard, mouse, stylus, or other input devices), one or more output devices 604 (which may include one or more displays, one or more speakers, one or more printers, or other output devices), one or more storage devices 606, and one or more storage medium 608. An input device 602 may be external or internal to computer system 600. An output device 604 may be external or internal to computer system 600. A storage device 606 may be external or internal to computer system 600. A storage medium 608 may be external or internal to computer system 600.

System bus 610 couples subsystems of computer system 600 to each other. Herein, reference to a bus encompasses one or more digital signal lines serving a common function. The present disclosure contemplates any suitable system bus 610 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 600 includes one or more processors 612 (or central processing units (CPUs)). A processor 612 may contain a cache 614 for temporary local storage of instructions, data, or computer addresses. Processors 612 are coupled to one or more storage devices, including memory 616. Memory 616 may include random access memory (RAM) 618 and read-only memory (ROM) 620. Data and instructions may transfer bidirectionally between processors 612 and RAM 618. Data and instructions may transfer unidirectionally to processors 612 from ROM 620. RAM 618 and ROM 620 may include any suitable computer-readable storage media.

Computer system 600 includes fixed storage 622 coupled bi-directionally to processors 612. Fixed storage 622 may be coupled to processors 612 via storage control unit 607. Fixed storage 622 may provide additional data storage capacity and may include any suitable computer-readable storage media. Fixed storage 622 may store an operating system (OS) 624, one or more executables (EXECs) 626, one or more applications or programs 628, data 630 and the like. Fixed storage 622 is typically a secondary storage medium (such as a hard disk) that is slower than primary storage. In appropriate cases, the information stored by fixed storage 622 may be incorporated as virtual memory into memory 616. In some embodiments, fixed storage 622 may include network resources, such as one or more storage area networks (SAN) or network-attached storage (NAS).

Processors 612 may be coupled to a variety of interfaces, such as, for example, graphics control 632, video interface 634, input interface 636, output interface 637, and storage interface 638, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 640 may couple processors 612 to another computer system or to network 642. Network interface 640 may include wired, wireless, or any combination of wired and wireless components. Such components may include wired network cards, wireless network cards, radios, antennas, cables, or any other appropriate components. With network interface 640, processors 612 may receive or send information from or to network 642 in the course of performing steps of particular embodiments. Particular embodiments may execute solely on processors 612. Particular embodiments may execute on processors 612 and on one or more remote processors operating together.

In a network environment, where computer system 600 is connected to network 642, computer system 600 may communicate with other devices connected to network 642. Computer system 600 may communicate with network 642 via network interface 640. For example, computer system 600 may receive information (such as a request or a response from another device) from network 642 in the form of one or more incoming packets at network interface 640 and memory 616 may store the incoming packets for subsequent processing. Computer system 600 may send information (such as a request or a response to another device) to network 642 in the form of one or more outgoing packets from network interface 640, which memory 616 may store prior to being sent. Processors 612 may access an incoming or outgoing packet in memory 616 to process it, according to particular needs.

Particular embodiments involve one or more computer-storage products that include one or more tangible, computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 616 may include one or more tangible, non-transitory, computer-readable storage media embodying software and computer system 600 may provide particular functionality described or illustrated herein as a result of processors 612 executing the software. Memory 616 may store and processors 612 may execute the software. Memory 616 may read the software from the computer-readable storage media in mass storage device 616 embodying the software or from one or more other sources via network interface 640. When executing the software, processors 612 may perform one or more steps of one or more processes described or illustrated herein, which may include defining one or more data structures for storage in memory 616 and modifying one or more of the data structures as directed by one or more portions the software, according to particular needs. In some embodiments, some or all components of guard 110, policy subsystems 150 and 160, policy enforcement services 170, 172, 174, 176, 180, 182, and 184 of FIG. 1, scheduler module 230 and assembly module 340 of FIG. 2, and assembly module 340 of FIG. 3, may be implemented using configurations such as the description of memory 616 above.

In some embodiments, the described processing and memory elements (such as processors 612 and memory 616) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 600 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the present disclosure encompass all such changes, substitutions, variations, alterations, and modifications as fall within the spirit and scope of the appended claims.

What is claimed is:

1. A computer-implemented method comprising:
   accessing, using one or more processors, a template, the template comprising a plurality of static portions and a plurality of dynamic portions;
   accessing, using the one or more processors, a first set of parameters associated with a first node, the first node located in a first security zone that is associated with a first security level;
   generating, using the one or more processors, a first set of instructions that configure a device to communicate with the first node, the first set of instructions comprising the static portions and the first set of parameters, the first set of parameters arranged according to the plurality of dynamic portions, the first set of instructions comprising Business Process Execution Language;

accessing, using the one or more processors, a second set of parameters associated with a second node that performs a plurality of functions not performed by the first node, wherein the second node is located in a second security zone that is associated with a second security level different from the first security level;

generating, using the one or more processors, a second set of instructions that configure the device to communicate with the second node, the second set of instructions comprising the static portions and the second set of parameters, the second set of parameters arranged according to the plurality of dynamic portions, the second set of instructions comprising Business Process Execution Language;

wherein the second node performs a secure communication with the first node via the device.

2. The computer-implemented method of claim 1, wherein:
the first set of parameters is accessed by accessing a first set of files comprising the first set of parameters; and
the second set of parameters is accessed by accessing a second set of files comprising the second set of parameters.

3. The computer-implemented method of claim 1, wherein the plurality of dynamic portions comprises one or more scripts.

4. The computer-implemented method of claim 1, further comprising generating, using the one or more processors, at least one workflow for the first node, the at least one workflow comprising the first set of instructions and the second set of instructions.

5. The computer-implemented method of claim 1, wherein generating the first set of instructions further comprises:
evaluating an expression in the plurality of dynamic portions; and
wherein the first set of parameters are arranged in the first set of instructions in response to evaluating the expression.

6. The computer-implemented method of claim 5, wherein the expression comprises a conditional statement.

7. The computer-implemented method of claim 5, wherein the expression comprises a loop mechanism.

8. An apparatus comprising:
at least one computer-readable medium comprising a first set of parameters, a second set of parameters, and a template;
at least one processor;
wherein the at least one processor is configured to:
access the template, the template comprising a plurality of static portions and a plurality of dynamic portions;
access the first set of parameters, the first set of parameters associated with a first node, the first node located in a first security zone that is associated with a first security level;
generate a first set of instructions that configure a device to communicate with the first node, the first set of instructions comprising the static portions and the first set of parameters, the first set of parameters arranged according to the plurality of dynamic portions, the first set of instructions comprising Business Process Execution Language;
access the second set of parameters, the second set of parameters associated with a second node that performs a plurality of functions not performed by the first node, wherein the second node is located in a second security zone that is associated with a second security level different from the first security level; and
generate a second set of instructions that configure the device to communicate with the second node, the second set of instructions comprising the static portions and the second set of parameters, the second set of parameters arranged according to the plurality of dynamic portions, the second set of instructions comprising Business Process Execution Language;
wherein the second node performs a secure communication with the first node via the device.

9. The apparatus of claim 8, wherein the plurality of dynamic portions comprises one or more scripts.

10. The apparatus of claim 8, wherein the at least one processor is further configured to generate at least one workflow for the first node, the at least one workflow comprising the first set of instructions and the second set of instructions.

11. The apparatus of claim 8, wherein the at least one processor generates the first set of instructions by:
evaluating an expression in the plurality of dynamic portions; and
wherein the first set of parameters are arranged in the first set of instructions in response to evaluating the expression.

12. The apparatus of claim 11, wherein the expression comprises a conditional statement.

13. The apparatus of claim 11, wherein the expression comprises a loop mechanism.

14. At least one non-transitory computer-readable medium comprising software that, when executed by at least one processor, is configured to:
access a template, the template comprising a plurality of static portions and a plurality of dynamic portions;
access a first set of parameters associated with a first node, the first node located in a first security zone that is associated with a first security level;
generate a first set of instructions that configure a device to communicate with the first node, the first set of instructions comprising the static portions and the first set of parameters, the first set of parameters arranged according to the plurality of dynamic portions, the first set of instructions comprising Business Process Execution Language;
access a second set of parameters associated with a second node that performs a plurality of functions not performed by the first node, wherein the second node is located in a second security zone that is associated with a second security level different from the first security level;
generate a second set of instructions that configure the device to communicate with the second node, the second set of instructions comprising the static portions and the second set of parameters, the second set of parameters arranged according to the plurality of dynamic portions, the second set of instructions comprising Business Process Execution Language;
wherein the second node performs a secure communication with the first node via the device.

15. The at least one computer-readable medium of claim 14, wherein:
the first set of parameters is accessed by accessing a first set of files comprising the first set of parameters; and
the second set of parameters is accessed by accessing a second set of files comprising the second set of parameters.

16. The at least one computer-readable medium of claim 14, wherein the plurality of dynamic portions comprises one or more scripts.

17. The at least one computer-readable medium of claim 14, wherein the software is further configured to generate at least one workflow for the first node, the at least one workflow comprising the first set of instructions and the second set of instructions.

18. The at least one computer-readable medium of claim 14, wherein the software generates the first set of instructions by:

evaluating an expression in the plurality of dynamic portions; and wherein the first set of parameters are arranged in the first set of instructions in response to evaluating the expression.

19. The at least one computer-readable medium of claim 18, wherein the expression comprises a conditional statement.

20. The at least one computer-readable medium of claim 18, wherein the expression comprises a loop mechanism.

\* \* \* \* \*